Hughes & Mapes,
Excavator.
No. 111,940. Patented Feb. 21, 1871.
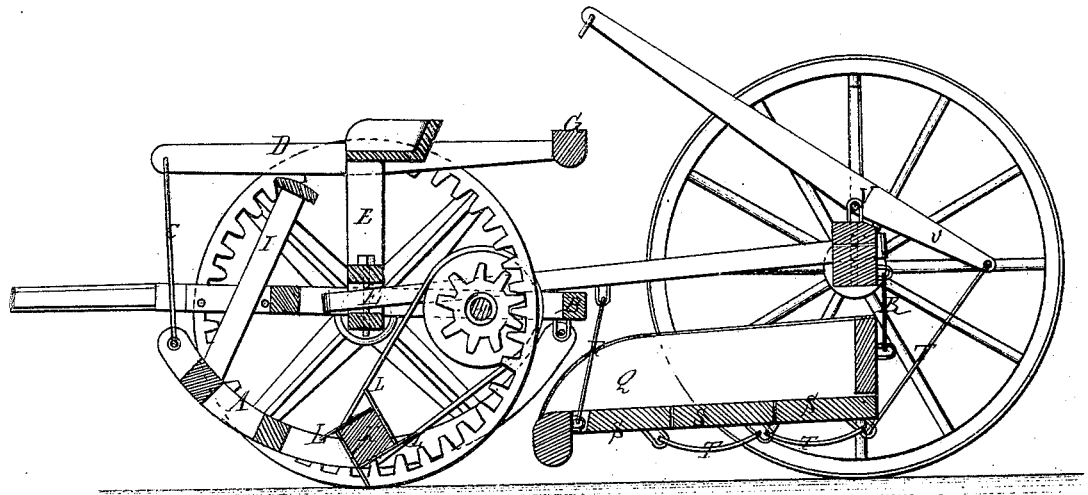
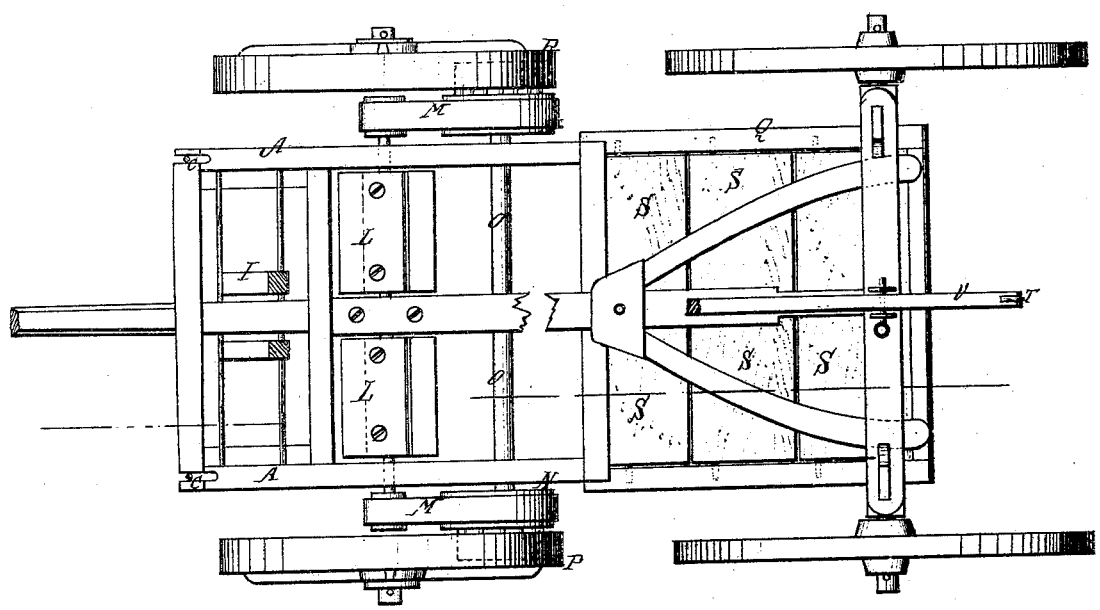

United States Patent Office.

JOSEPH M. HUGHES AND ANDREW J. MAPES, OF INDEPENDENCE, MISSOURI.

Letters Patent No. 111,940, dated February 21, 1871.

IMPROVEMENT IN EXCAVATING-MACHINES.

The Schedule referred to in these Letters Patent and making part of the same.

*To all whom it may concern:*

Be it known that we, JOSEPH M. HUGHES and ANDREW J. MAPES, of Independence, in the county of Jackson and State of Missouri, have invented a new and improved Excavating-Machine; and we do hereby declare that the following is a full, clear, and exact description thereof, which will enable others skilled in the art to make and use the same, reference being had to the accompanying drawing forming part of this specification.

This invention relates to improvements in excavating-machines, and consists in a pair of rotary diggers or spaders of peculiar construction, located in a vertically-adjustable frame under the fore-wheels of a truck, and operated by gearing connected with the said wheels in a manner to spade up the surface of the earth, and throw it upward and backward upon a suspended tray or receiver, on which it may be carried away to be discharged, by tilting the several boards of the bottom of said tray, which are journalled and provided with tilting apparatus for the purpose.

The frame supporting the spaders swings up, to raise them above the ground when they are not to be worked.

Figure 1 is a longitudinal sectional elevation through our machine, and

Figure 2 is a plan of the top, a part being removed.

Similar letters of reference indicate corresponding parts.

A represents a frame of curved bars hinged to the rear part of the hounds B of an ordinary wagon or truck, and suspended at the front end of a balancing-frame, D, mounted on the standards E, which rise up from the axle F, the said frame being arranged on the said support so as to be tilted backward by the weighted bar G, which is designed to slightly overbalance the spaders.

H is the seat for the driver. It is mounted on the tilting-frame as shown.

The frame A is provided with the foot-stand I, near the front, so located that the driver, sitting on the seat, and putting his foot on the stand I may swing the frame A down.

This frame causes a pair of rotary spaders, consisting of the square shafts K and spades, L, arranged as shown, the spades being attached one each side, and projecting forward beyond the side perpendicular to the ones to which they are connected.

These spaders are journalled in the curved bars of the frame A, so as to turn independently of each other. They are driven by belts M and drums N, the latter mounted on the shafts O, and gearing with the internally-toothed front wheels P of the wagon.

These drums are also arranged to work independently of each other, so that the front part of the wagon may turn horizontally with facility.

Q is the receiving-tray or box. It is suspended behind the spades just above the ground by rods R, from the reach and hind axle, so that the earth raised and thrown back by the rapidly-revolving spades will fall upon it.

Having thus described our invention,

We claim as new and desire to secure by Letters Patent—

1. The hinged frame A, (of curved bars,) the hounds B, balancing-frame D, and overbalancing bar G, combined with a rotary spading device K L, as and for the purpose described.

2. The subject-matter of first claim, combined with a foot-stand, I, arranged with respect to the driver's seat, as and for the purpose described.

3. In an excavating-machine, the arrangement of the spades L in a plane parallel to the axis of their rotating-shaft, to strike the earth downward at an acute angle, and pitch the earth upwardly at a corresponding angle into the receptacle.

JOSEPH M. HUGHES.
ANDREW J. MAPES.

Witnesses:
E. A. HICKMAN,
HENRY CRUMP.